United States Patent
Miller et al.

(10) Patent No.: US 8,385,223 B2
(45) Date of Patent: Feb. 26, 2013

(54) INTERFERENCE RESISTANT SATELLITE LINK POWER CONTROL USING DOWNLINK BEACON

(75) Inventors: Mark J. Miller, Vista, CA (US); David Irvine, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 230 days.

(21) Appl. No.: 12/831,958

(22) Filed: Jul. 7, 2010

(65) Prior Publication Data

US 2011/0007646 A1    Jan. 13, 2011

Related U.S. Application Data

(60) Provisional application No. 61/224,345, filed on Jul. 9, 2009, provisional application No. 61/224,355, filed on Jul. 9, 2009, provisional application No. 61/223,878, filed on Jul. 8, 2009.

(51) Int. Cl.
*G01R 31/08* (2006.01)
(52) U.S. Cl. .................. 370/252; 370/315
(58) Field of Classification Search .......... 370/316–327, 370/401–427, 334–338, 252–253; 455/522, 455/69
See application file for complete search history.

(56) References Cited

U.S. PATENT DOCUMENTS

| | | | |
|---|---|---|---|
| 4,941,199 A | 7/1990 | Saam | |
| 2006/0030351 A1* | 2/2006 | Miller et al. | 455/522 |
| 2006/0292990 A1* | 12/2006 | Karabinis et al. | 455/63.4 |
| 2007/0087690 A1 | 4/2007 | Karabinis | |
| 2009/0195444 A1 | 8/2009 | Miller | |
| 2010/0128661 A1* | 5/2010 | Becker et al. | 370/316 |

FOREIGN PATENT DOCUMENTS

| | | |
|---|---|---|
| EP | 0079612 A1 | 5/1983 |
| EP | 0707389 A2 | 4/1996 |
| EP | 1049269 A2 | 11/2000 |
| EP | 1168671 A2 | 1/2002 |
| WO | 2009/072731 A1 | 6/2009 |

OTHER PUBLICATIONS

U.S. Appl. No. 12/831,972, filed Jul. 7, 2010, Miller et al.
U.S. Appl. No. 12/831,966, filed Jul. 7, 2010, Miller.
European Search Report for European Application No. 10168863.8, mailed on Jun. 27, 2012, 7 pages.
European Search Report for European Application No. 10169099.8, mailed on Jun. 28, 2012, 7 pages.

* cited by examiner

*Primary Examiner* — Ricky Ngo
*Assistant Examiner* — Iqbal Zaidi
(74) *Attorney, Agent, or Firm* — Kilpatrick Townsend & Stockton LLP

(57) ABSTRACT

A method for determining EIRP of user terminals in a satellite communication system comprises obtaining a frequency gain of a gateway at one or more frequencies, obtaining a path gain of the gateway for one or more signal paths, and obtaining a satellite beacon signal power at a receiver of the gateway. The method also comprises determining a target signal power at the gateway for one or more frequency channels, where the target signal power based at least in part on the frequency gain, the path gain, and the satellite beacon signal power. The method also comprises obtaining a message signal power at the gateway of a message from a user terminal, and determining the EIRP of the user terminal based at least in part on a difference between the target signal power and the message signal power.

20 Claims, 8 Drawing Sheets

INTERFERENCE RESISTANT SATELLITE LINK POWER CONTROL USING DOWNLINK BEACON

CROSS-REFERENCES TO RELATED APPLICATIONS

The present application claims benefit of priority under 35 U.S.C. 119(e) of U.S. Provisional Application Nos. 61/223,878, filed Jul. 8, 2009, entitled "Interference Resistant Satellite Link Power Control Using Downlink Beacon;" 61/224,345, filed Jul. 9, 2009, entitled "Interference Resistant Satellite Link Power Control Using Uplink Noise Measurements;" and 61/224,355, filed Jul. 9, 2009, entitled "MF-TDMA Satellite Link Power Control;" the contents of which are incorporated herein by reference in their entirety.

The following U.S. nonprovisional patent applications, including the present application, are being filed concurrently, and the disclosure of the other applications are incorporated by reference in the present application in their entirety for all purposes:

- U.S. Nonprovisional patent application Ser. No. 12/831,958, filed Jul. 7, 2010, entitled " Interference Resistant Satellite Link Power Control Using Downlink Beacon".
- U.S. Nonprovisional patent application Ser. No. 12/831,972, filed Jul. 7, 2010, entitled " MF-TDMA Satellite Link Power Control".
- U.S. Nonprovisional patent application Ser. No. 12/831,966, filed Jul. 7, 2010, entitled " Interference Resistant Satellite Link Power Control Using Uplink Noise Measurements".

FIELD OF THE INVENTION

The present invention relates generally to satellite communications systems. More particularly, the present invention relates to methods and apparatuses for providing return link power control in satellite communications systems.

BACKGROUND

Satellite communications systems transmit content over large geographic regions. In a typical satellite communications system, end users interface with the system through user terminals. The user terminals communicate, via one or more satellites, with one or more gateway terminals. The gateway terminals may process and route data to and from one or more networks according to various protocols.

A typical hub-spoke spot beam satellite communications system may include a non-processing "bent pipe" spot beam satellite, many user terminals, and a smaller number of gateway terminals. Each user terminal may be connected to a network, such as the internet, via a series of communication links.

A forward link of a satellite communications system may consist of a forward uplink transmission from a gateway terminal to a satellite, a "bent pipe" repeater at the satellite, and a forward downlink transmission to a group of user terminals located in a common spot beam. The forward link may carry data from a gateway terminal to many different user terminals. The forward link may utilize, for example, time Division Multiplexing (TDM) and/or Frequency Division Multiplexing (FDM) of data into RF transmissions.

A return link of a satellite communications system may consist of a return uplink transmission from user terminals in a common spot beam to a satellite, and a return downlink transmission from the satellite to a gateway terminal servicing the spot beam. Transmissions from many user terminals may utilize the return link using Time Division Multiple Access (TDMA), Frequency Division Multiple Access (FDMA), Code Division Multiple Access (CDMA), or the like.

For typical multiple access schemes (e.g., TDMA, FDMA, CDMA, etc.), bandwidth utilization varies with time. As a result, interference to and from other spot beams (both co-polarized and cross-polarized) or even within the same beam may be time varying and dynamic. User terminals generally transmit only when they have data that needs to be transmitted and when they have been assigned one or more slots, frequencies, CDMA codes, or the like for transmission.

In moderate frequency re-use environments that are typical of high capacity spot beam satellites, interference from nearby spot beams operating on the same frequency can cause fluctuation of an end-to-end signal to noise plus interference ratio (SINR). The end-to-end SINR may vary by as much as 5 dB or more. Furthermore, interference can be very dynamic. Bursts in a TDMA system may be as short as 10 µSec or less in duration. Traditional closed loop power control schemes that adjust effective isotropic radiated power (EIRP) at user terminals in response to a measured SINR cannot track dynamic interference because round trip delay through a geosynchronous satellite is typically more than 500 mSec (including processing time at the gateway terminals). As a result, such approaches perform poorly in dynamic and high interference environments.

Thus, there is a need for improved satellite link power control in dynamic and high interference environments.

SUMMARY

The present invention provides improved power control of return link transmissions in satellite communications systems. For example, some embodiments of the present invention adjust an EIRP of each user terminal in the satellite communications system based on a difference between a message signal power and a target signal power. Such embodiments can provide a balance of signal power spectral densities at the satellite. This can reduce interference from other spot beams using the same or similar frequencies and can keep return link satellite EIRP fairly shared among all return link transmissions.

In accordance with an embodiment of the invention, a method for determining EIRP of user terminals in a satellite communication system comprises obtaining a frequency gain of a gateway at one or more frequencies, obtaining a path gain of the gateway for one or more signal paths, and obtaining a satellite beacon signal power at a receiver of the gateway. The method also comprises determining a target signal power at the gateway for one or more frequency channels, where the target signal power based at least in part on the frequency gain, the path gain, and the satellite beacon signal power. The method also comprises obtaining a message signal power at the gateway of a message from a user terminal, and determining the EIRP of the user terminal based at least in part on a difference between the target signal power and the message signal power.

In accordance with another embodiment of the invention, a process for controlling power of return link transmissions in a satellite communications system comprises determining a first signal power of a first message from a user terminal, determining a first target signal power, and determining a first EIRP of the user terminal based at least in part on a difference between the first signal power of the first message and the first target signal power. The process also comprises waiting a period of time, and repeating the process by determining a second signal power of a second message from the user terminal, determining a second target signal power, and determining a second EIRP of the user terminal based at least in part on a difference between the second signal power of the second message and the second target signal power.

In accordance with another embodiment of the invention, an apparatus for determining EIRP of user terminals in a satellite communication system comprises an obtaining module configured to obtain at least one of a frequency gain or a path gain of a pilot tone in a gateway, obtain a satellite beacon signal power at the gateway, and obtain a message signal power at the gateway of a message from a user terminal. The apparatus also comprises a determining module configured to determine a target signal power at the gateway based at least in part on at least one of the frequency gain, the path gain, or the satellite beacon signal power, and determine the EIRP of the user terminal based at least in part on a difference between the message signal power and the target signal power.

Numerous benefits are achieved using the present invention over conventional techniques. For example, some embodiments provide methods for adjusting the EIRP of each user terminal individually. This can help maintain the balance of signal power spectral densities at the satellite. As another example, some embodiments provide methods for adjusting the EIRP of user terminals based on return uplink propagation losses (e.g., rain), while ignoring return downlink propagation losses and dynamic interference. This can also help to provide a balance of signal power spectral densities at the satellite. Depending upon the embodiment, one or more of these benefits may exist. These and other benefits are described throughout the specification and more particularly below.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label with a dash and a second label that distinguishes among the similar components. If only the first reference label is used in the specification, the description is applicable to any one of the similar components having the same reference label irrespective of the second reference label.

DETAILED DESCRIPTION

The present invention provides improved methods and apparatuses for controlling the power of return link transmissions in satellite communications systems. Some embodiments provide methods for adjusting an EIRP of each user terminal in the satellite communications system. The EIRP of a user terminal may be adjusted based on a difference between a signal power of a message sent from the user terminal and a target signal power (denoted P*). The signal power of the message sent from the user terminal may be determined at a gateway demodulator. The target signal power may be determined based on a number of factors including, for example, a desired satellite return link EIRP density (dBW/Hz), a satellite beacon signal power, gateway calibration data, and gateway demodulator automatic gain control (AGC). Such embodiments can improve system performance in dynamic and high interference environments. These and other embodiments of the present invention are described more fully below.

Figure 1:
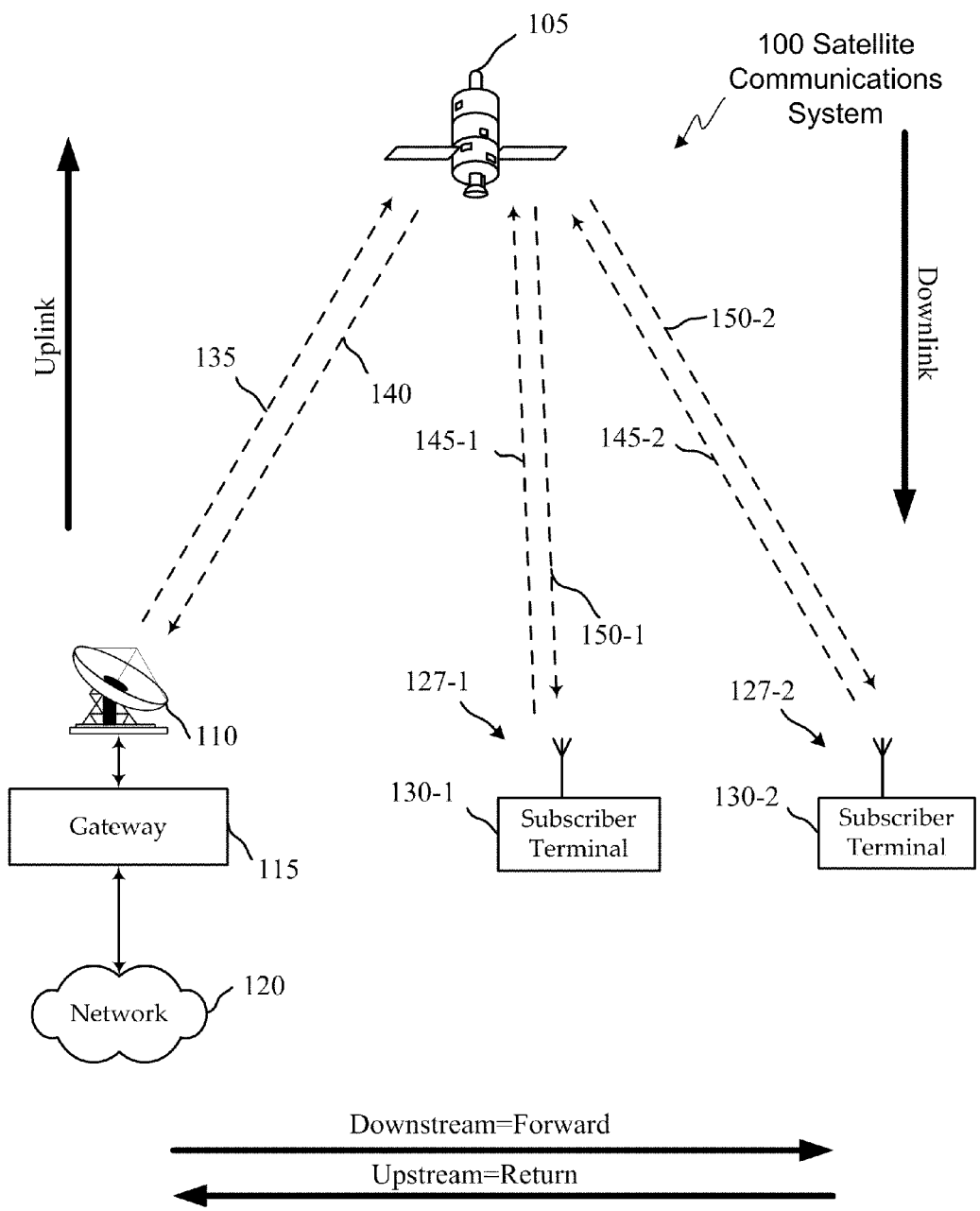
FIG. 1 is a simplified diagram of an exemplary satellite communications system in which the methods and apparatuses of the present invention may be used.

FIG. 1 is a simplified diagram of an exemplary satellite communications system 100 in which the methods and apparatuses of the present invention may be utilized. Satellite communications system 100 includes a network 120 interfaced with one or more gateway terminals 115. The gateway terminal 115 is configured to communicate with one or more user terminals 130 via a satellite 105.

The gateway terminal 115 is sometimes referred to as a hub or ground station. The gateway terminal 115 services uplink 135 and downlink 140 to and from the satellite 105. The gateway terminal 115 may also schedule traffic to the user terminals 130. Alternatively, the scheduling may be performed in other parts of the satellite communications system 100 (e.g., at one or more network operations centers (NOC) and/or gateway command centers). Although only one gateway terminal 115 is shown in FIG. 1, embodiments of the present invention may be implemented in satellite communications systems having a plurality of gateway terminals each of which may be coupled to one or more networks.

In some satellite communications systems, there may be a limited amount of frequency spectrum available for transmission. Communication links between the gateway terminal 115 and the satellite 105 may use the same, overlapping, or different frequencies as communication links between the satellite 105 and the user terminals 130. The gateway terminal 115 may be located remote from the user terminals 130 to enable frequency re-use.

The network 120 may be any type of network and can include, for example, the Internet, an IP network, an intranet, a wide-area network (WAN), a local-area network (LAN), a virtual private network (VPN), a virtual LAN (VLAN), a fiber optic network, a hybrid fiber-coax network, a cable network, a public switched telephone network (PSTN), a public switched data network (PSDN), a public land mobile network, and/or any other type of network supporting data communication between devices described herein. The network 120 may include both wired and wireless connections as well as optical links. The network 120 may connect the gateway terminal 115 with other gateway terminals that may be in communication with the satellite 105 or with other satellites.

The gateway terminal 115 provides an interface between the network 120 and the satellite 105. The gateway terminal 115 may be configured to receive data and information directed to one or more user terminals 130. The gateway terminal 115 may format the data and information for delivery to the respective user terminal 130. Similarly, the gateway terminal 115 may be configured to receive signals from the satellite 105 (e.g., from one or more user terminals 130) directed to a destination accessible via the network 120. The gateway terminal 115 may format the received signals for transmission to the destination via the network 120.

The gateway terminal 115 may use an antenna 110 to transmit an uplink signal 135 to the satellite 105. In one embodiment, the antenna 110 may comprise a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, and low noise.

The satellite 105 may be a geostationary satellite that is configured to receive the uplink signals 135 from the location of the antenna 110. The satellite 105 may, for example, use a reflector antenna, lens antenna, phased array antenna, active antenna, or any other mechanism known in the art for reception of such signals. The satellite 105 may process the signals received from the gateway terminal 115 and forward the downlink signals 135 to one or more of the user terminals 130. The signals may be passed through a transmit reflector antenna (e.g., a phased array antenna) to form the transmission radiation pattern (spot beam). The satellite 105 may operate in a multiple spot-beam mode, transmitting a number of narrow beams each directed at a different region of the earth. This allows segregation of the user terminals 130 into the various narrow beams.

The satellite 105 may be configured as a "bent pipe" satellite. In this configuration, the satellite 105 may perform frequency and polarization conversion of the received carrier signals before re-transmission of the signals to their destination. A spot beam may use a single carrier, i.e., one frequency, or a contiguous frequency range per beam. A variety of physical layer transmission modulation and coding techniques may be used by the satellite 105 (e.g., adaptive coding and modulation).

The satellite communications system 100 may use a number of network architectures consisting of space and ground segments. The space segment may include one or more satellites while the ground segment may include one or more user terminals, gateway terminals, network operations centers (NOCs), and satellite and gateway terminal command centers. The segments may be connected via a mesh network, a star network, or the like as would be evident to those skilled in the art.

The downlink signals 150 may be transmitted from the satellite 105 to one or more user terminals 130. The user terminals 130 may receive the downlink signals using an antenna 127. In one embodiment, the antenna 127 and the user terminal 130 together comprise a very small aperture terminal (VSAT), with the antenna 127 measuring approximately 0.6 meters in diameter and having approximately 2 watts of power. In other embodiments, a variety of other types of antennas 127 may be used at the user terminal 130 to receive the downlink signals 150 from the satellite 105. Each of the user terminals 130 may comprise a single user terminal or, alternatively, may comprise a hub or router (not pictured) that is coupled to multiple user terminals. Each user terminal 130 may be connected to various consumer premises equipment (CPE) comprising, for example, computers, local area networks, internet appliances, wireless networks, and the like.

In a manner similar to that described above, the user terminals 130 may use return link transmissions to communicate with the gateway terminal 115 or the network 120 via the satellite 105. The return link may consist of return uplink transmissions 145 from the user terminals 130 to the satellite 105, and return downlink transmissions 135 from the satellite 105 to the gateway terminal 115. The gateway terminal 115 may format the received signals for transmission to one or more destinations that are accessible via the network 120.

In accordance with an embodiment of the present invention, the signal power of the return link transmissions may be controlled by adjusting the EIRP of the user terminals 130. The EIRP of the user terminals 130 may be adjusted based on a difference between a signal power of messages sent from the user terminals 130 and a target signal power (P*). The signal power of the messages sent from the user terminals 130 may be determined at the gateway 115. P* may be determined, for example, based on desired satellite return link EIRP density (dBW/Hz), satellite beacon signal power, gateway calibration data, gateway demodulator automatic gain control (AGC), and/or other factors.

Signal Power of Messages Sent from User Terminals

In accordance with an embodiment of the present invention, a signal power of a message sent from the user terminal 130 may be used in the return link power control. The message may be data transmissions or other message and may be sent at a specified rate. Such messages will be referred to broadly throughout this specification as periodic management messages (PMMs). In a particular embodiment, a PMM may be sent from each user terminal every 320-640 mSec (1.56-3.13 Hz). This frequency should be sufficient to provide accurate tracking of dynamic uplink fades in return link transmissions of typical satellite communications systems. Of course, other rates may be specified based on the particular application. The user terminals 130 may transmits the PMMs using the same EIRP that is normally used for data transmissions. In addition to being used for return link power control, the PMMs may also be used for non-linearity avoidance, TDMA synchronization maintenance, keep alives, bandwidth requests, forward link SINR reporting, and other communications.

Demodulators at the gateway 115 may be used to provide estimates of received signal power (or message signal power) for each PMM. The estimated message signal power may be proportional to the log of a received power of a desired signal (Log(S)). This number may be proportional to a dB value. The message signal power estimates may be compared to the target signal power (P*) and the difference used to adjust the EIRP of the user terminal 130 that sent the PMM. Estimates of message signal power for PMMs that contain bit errors, as determined, for example, by a cyclic redundancy check (CRC) within the PMM, may be ignored.

The demodulators may also provide estimates of total received power and received SINR. The total received power estimate may be proportional to a log of the total received power $(Log(S+N+I)^2)$. The received SINR may be proportional to a log of the SINR $(Log(S/(N+I)))$. These numbers may be proportional to dB values.

In addition to the above estimates, the demodulators may also provide other information about each PMM such as a frequency of arrival error, a time of arrival error, and an output dither estimate. The output dither estimate may be, for example, proportional to a log of a ratio of signal power in even numbered symbols to signal power in odd numbered symbols. This information may or may not be used in return link power control.

Target Signal Power

The target signal power (P*) may be a desired value of the message signal power at a demodulator of the gateway 115. In an embodiment, P* may be calculated for each channel in the return link. The return link may be segmented into one or more return channel groups (RCGs) spanning all or a portion of the return link bandwidth. In one embodiment, for example, the return link bandwidth may span 500 MHz and be segmented into four RCGs each spanning 125 MHz. The gateway 115 may include one or more demodulators, and each demodulator may provide burst demodulation for each carrier in one or more of the RCGs.

In accordance with the various embodiments of the present invention, P* may be a function of one or more of the following factors: (1) the target satellite return link EIRP density, (2) satellite beacon EIRP, (3) gateway calibration data, (4) satellite beacon signal power, (5) observed level of rain fade on the return downlink, (6) gateway demodulator automatic gain control (AGC), (7) channel symbol rate, and/or other factors.

Merely by way of example, in one embodiment P* may be calculated for each channel (from k=0 to K−1) of an RCG in the return link using the following equation:

$$P^*(k) = 10 \cdot \text{Log10}(R_{sym}(k)) + EIRP^* - EIRP_b + \Delta_{poly}(f_k) + B_{now} + (B_{cs} - B_{now}) \cdot \left(1 - \frac{f_k^2}{f_b^2}\right) - A_{now} \quad (1)$$

where,
P*(k) is the target signal power for channel k (may be in dB or other units);
$R_{sym}(k)$ is the symbol rate for channel k;
EIRP* is the target satellite return link EIRP density (may be in dBW/Hz or other units);
$EIRP_b$ is the satellite beacon EIRP (may be in dBW/Hz or other units);
$\Delta_{poly}(f_k)$ is the gateway calibration data (may be in dB or other units);
$B_{now}$ is the satellite beacon signal power (may be in dB or other units);
$B_{cs}$ is a clear sky satellite beacon signal power (may be in dB or other units);
$f_k$ is a center frequency of channel k at a Ka band downlink;
$f_b$ is a frequency of the satellite beacon; and
$A_{now}$ is gateway demodulator AGC attenuation (may be in dB or other units).

Due to changes in the downlink propagation loss (fain, scintillation, atmospheric losses, etc.) as well as drift in net gain associated with the gateway 115 (LNA's, downconverters, IF gain, and the like), the value of P* will likely change with time. In accordance with embodiments of the present invention, P* may be re-calculated to track these changes. The value of P* may be re-calculated at a specified rate or upon occurrence of a specified event. For example, in one embodiment P* may be re-calculated each time there is a change in $B_{now}$, $A_{now}$, $\Delta_{poly}(f_k)$, or $B_{cs}$, or when there is a new channelization generated (new $f_k$ values).

(1) Target Satellite Return Link EIRP Density

In accordance with an embodiment of the present invention, P* may be proportional to the target satellite return link EIRP density (denoted EIRP*). Hence, the EIRP of each user terminal 130 can be adjusted to maintain the message signal power within some delta of P* and the satellite EIRP within some delta of EIRP*. EIRP* may be determined, for example, as part of a system design or based on actual or expected operation of the satellite communications system 100.

When a user terminal 130 comes on-line in the satellite communications system 100, a two-dimensional (e.g., time and power) search may be employed to set the initial EIRP of the user terminal 130 so that the satellite return link EIRP density is approximately equal to the desired EIRP* value. Embodiments of the present invention may be used to adjust the EIRP of each user terminal 130 so that the satellite return link density remains approximately equal to the desired EIRP* value.

(2) Satellite Beacon EIRP

Satellite beacon EIRP may also be used to determine P* in accordance with an embodiment of the invention. This value may be determined initially by an In-Orbit-Test (IOT) measurement of the satellite 105. Subsequently, a pilot tone injection system may be used to determine satellite beacon EIRP. As an example, a pilot tone may be introduced by the pilot tone injection system at a specified frequency (e.g., 200 kHz from nominal beacon frequency). A power of the pilot tone as introduced by the pilot tone injection system ($P_{meter}$) a power of the pilot tone as received at a beacon receiver ($P_{pilot}$), and a power of the satellite beacon as received at the beacon receiver ($P_{beacon}$) may be determined. These values may be used to calculate the satellite beacon EIRP using the following equation:

$$EIRP_{beacon} = P_{meter} + (P_{beacon} - P_{pilot}) - K - G_{ant} + L_{ant} + L_o \quad (2)$$

where K is a constant associated with losses in the pilot tone injection system, $G_{ant}$ is an antenna output gain, $L_{ant}$ is a loss from antenna output to coupler input, and $L_o$ is a free space path loss. $L_o$ can be calculated and K, $G_{ant}$, and $L_{ant}$ can be determined as part of the gateway 115 installation process. Satellite beacon EIRP is preferably determined when no atmospheric losses (e.g., rain) are present.

(3) Gateway Calibration Data

Figure 2:
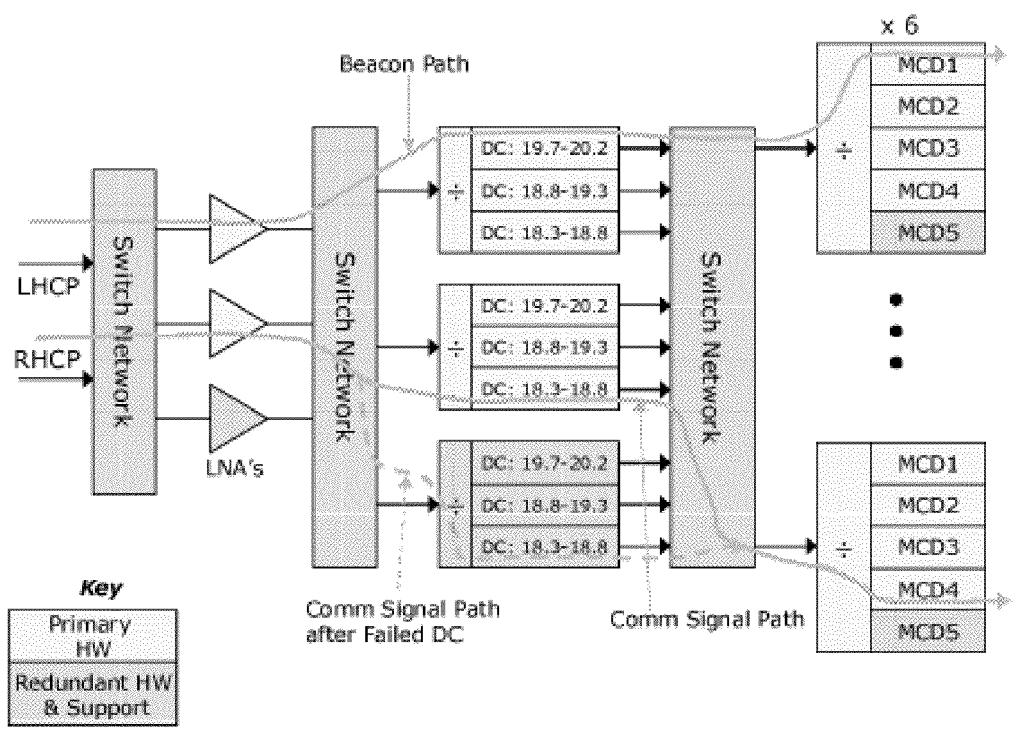
FIG. 2 is a simplified diagram of signal paths within a gateway.

Gateway calibration data may also be used to determine P* in accordance with an embodiment of the present invention. The gateway calibration may include, for example, frequency gain and/or path gain. As illustrated in FIG. 2, there are a number of signal paths within the gateway 115 from an output of the antenna 110 (input to switch network) to the demodulators (or digital receivers). The demodulators may be multichannel demodulators (MCD) configured to provide burst demodulation of all carriers within one or more RCGs. The demodulators may include one or more beacon receivers, pilot receivers, and/or burst receivers. The different signals (e.g., beacon, pilot, burst) may take different paths or pass through different devices within the gateway 115. For example, the different signals may pass through different low noise amplifiers (LNAs), downconverters, and intermediate frequency (IF) sections of the MDCs. As illustrated in FIG. 2, for example, a beacon signal may take a different path than a burst (or communication) signal. Error in the power estimates may be introduced if the two paths have a different net gain.

Gain variations can also occur between different frequencies within the same path as well as over time due to thermal drift. Frequency variations can be accounted for by calibrating over frequency, and thermal drift can be accounted for by re-calibration at a specified frequency or based on some other factor such as a particular event.

The frequency gain and the path gain may be determined using a pilot tone injection system. This may be the same or a different system than that used for satellite beacon EIRP measurements. The pilot tones may be RF signals generated at a specified power and frequency. The pilot tones may be introduced into the LNAs of the gateway 115, and a power of the pilot tones may be measured using one or more demodulators at the gateway 115. The process may be repeated at various frequencies for all active signal paths through the LNAs to the demodulators to provide a frequency response. Alternatively, the process may be performed at a particular frequency to provide the frequency gain at single frequency.

Figure 3:
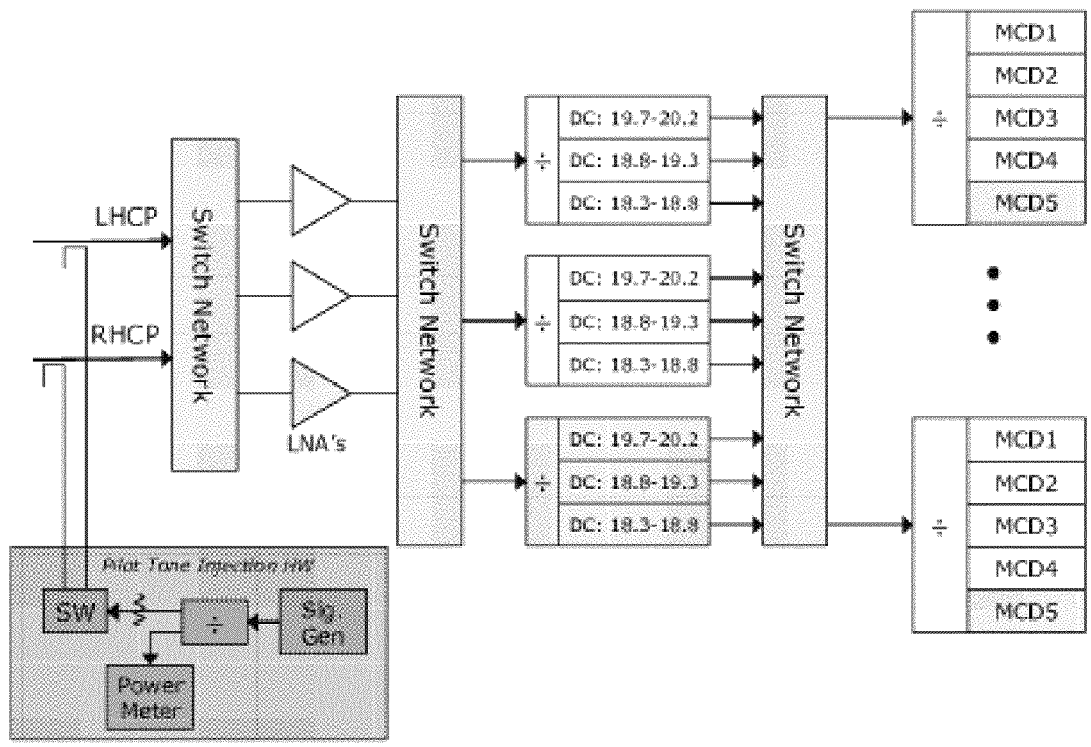
FIG. 3 is a simplified diagram of a gateway with a pilot tone injection system in accordance with an embodiment of the present invention.

FIG. 3 is a simplified diagram of a gateway 115 with a pilot tone injection system in accordance with an embodiment of the present invention. The pilot tone injection system may be integrated with the gateway 115 or it may be a separate device. The pilot tone injection system may be configured to introduce pilot tones into a front end of the gateway 115. A power of the pilot tone may be determined by a pilot receiver in the demodulators to determine a net gain through the particular path. The process may be repeated over different frequencies in each RCG for all active signal paths to generate calibration polynomials.

Merely by way of example, an exemplary gateway calibration procedure may include performing a gain measurement at a frequency that is close (e.g., within about 200 kHz) to nominal beacon frequency and at the same polarization. In accordance with an embodiment of the invention, the gain measurement may include the following steps:

1. Mute a signal generator of the pilot tone injection system;
2. Tune the signal generator to a desired frequency (e.g., within about 200 kHz from the nominal beacon frequency);
3. Set the signal generator output power to approximately −100 dBm;
4. Select the polarization (i.e., RHCP or LHCP);
5. Allow the signal generator to stabilize;
6. Un-mute the signal generator;
7. Provide an IF frequency and power meter level ($P_{in}$) to a pilot receiver for the appropriate MCD;
8. Determine a power of the pilot tone at the pilot receiver;
9. Calculate the gain as $G(f)=P_{MCD}-P_{in}$ (all units in dB); and
10. Mute the signal generator.

The gain measurement performed close to the nominal beacon frequency may be denoted $G_{ref}$. The procedure outlined above may be repeated at various frequencies to provide gain measurements ($G(f_k)$) across the frequency spectrum of each RCG.

Figure 4:
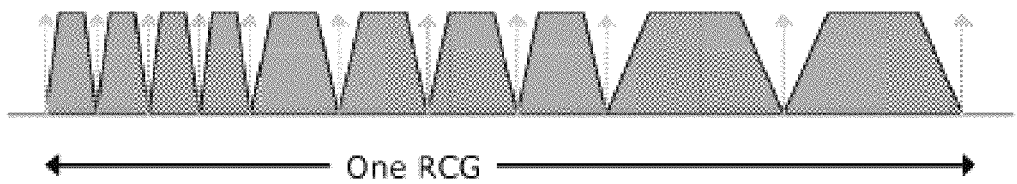
FIG. 4 is a simplified diagram showing gain measurements at frequencies between channels in a return channel group (RCG) in accordance with an embodiment of the present invention.

In an embodiment, the measurement frequencies are selected in gaps between existing RCG channels as shown in FIG. 4. This provides a gateway calibration procedure that may be non-interfering in that it can be performed while communication traffic is present.

The measurement frequencies used for the calibration procedure may be spaced to minimize the number of required measurements. As an example, in some embodiments it may not be necessary to perform measurements at frequencies that are less than about 5 MHz apart. Thus, some gaps between channels may be skipped depending on the spacing between the gaps.

Gain measurements obtained using the exemplary gateway calibration procedure described above provide a set of K ordered pairs [$f_k$, $G(f_k)-G_{ref}$] for each RCG. The first coordinate of the ordered pair is the measurement frequency with respect to a lower edge of the RCG (in MHz). The second coordinate is the gain difference between $G(f_k)$ and $G_{ref}$. The K ordered pairs may be used to determine coefficients of the following $2^{nd}$ order polynomial:

$$\Delta_{poly}(f_k)=a_2 x^2+a_1 x+a_0|_{x=f_k/W_{RCG}} \quad (3)$$

Equation (3) can be used to describe the gain difference at any frequency within the RCG.

The generation of the coefficients may be performed using a standard least squares algorithm or other method as would be appreciated by one of ordinary skill in the art. This approach provides smoothing of the calibration data across the RCG and allows for re-calculation of the data at different frequencies (which may be needed for changes in channelization). The gateway calibration procedure may be performed at specified time intervals or following the occurrence of specific events.

(4) Satellite Beacon Signal Power

Satellite beacon signal power may also be used to determine P* in accordance with an embodiment of the present invention. The satellite beacon signal power may be used, for example, to separate propagation losses affecting a return uplink transmission from those affecting return downlink transmissions. In some embodiments, the return link power control may ignore return downlink propagation losses. This helps balance signal power spectral densities at the satellite.

A beacon receiver (or demodulator) at the gateway 115 may provide an absolute level of the satellite beacon signal power (or estimates of a log of the satellite beacon signal power). These satellite beacon signal power measurements may be provided in dB's or in units proportional to dB's. The beacon signal may be selected to be at or near the frequency of the downlink band. For example, in one embodiment the beacon signal may have a frequency of between about 19.7-20.2 GHz. Also, the power measurements may be performed at a specified rate. For example, in one embodiment the beacon receiver may provide the measured signal power at a rate of approximately 15 Hz. This rate is generally sufficient to capture variations due to atmospheric scintillation.

The satellite beacon signal power measurements may be filtered so that they have insignificant variance due to thermal noise and are frequent enough to capture the beacon power variation due to fading, scintillation, and analog hardware gain drift. For example, the power measurements may be normalized to account for AGC attenuation of the beacon receiver. This provides a normalized beacon power $B_{now}$. Additional filtering and sample rate reduction may be used to generate a filtered beacon power $B_{filt}$. $B_{filt}$ may be determined at a rate of about once per 10-15 seconds to reduce variation due to scintillation. A minimum filtered value ($B_{min}$) may be determined at a rate of about once per 1-3 minutes. A clear sky level of the satellite beacon signal power ($B_{cs}$) may be a maximum of the $B_{min}$ values over a 48-96 hour interval.

The beacon receiver may also provide a total power estimate, a frequency error estimate, and a receiver lock indication. The total power and frequency error estimates may be provided at a rate synchronous with the satellite beacon signal power estimate. The lock indication may be provided as an interrupt anytime the lock status changes.

Figure 5:
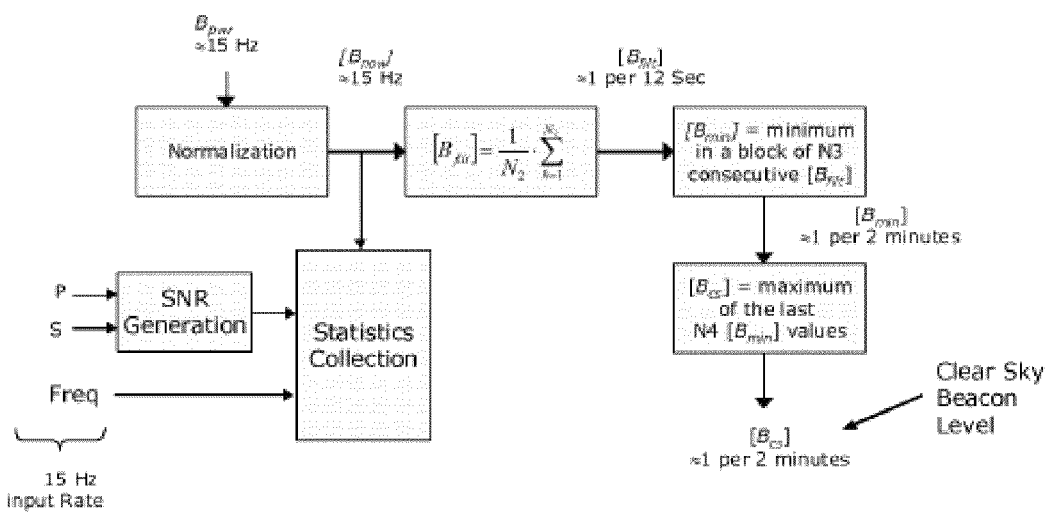
FIG. 5 is a simplified flowchart illustrating an exemplary method of satellite beacon signal processing in accordance with an embodiment of the present invention.

FIG. 5 is a simplified diagram illustrating an exemplary method of satellite beacon signal processing in accordance with an embodiment of the present invention. The operations within the normalization block depend on whether the AGC attenuation of the beacon receiver has changed during the interval used to generate the sample $B_{pwr}(n)$. In an embodiment, $B_{now}$ is determined using one of the following equations:

$$B_{now}(n)=C \cdot B_{pwr}(n)+A_{now}(n) \text{—used if no AGC change has occurred during interval;} \quad (4)$$

$$B_{now}(n)=C \cdot B_{now}(n-1) \text{—used if AGC has changed during interval;} \quad (5)$$

where $B_{pwr}(n)$ is the current sample provided by the beacon receiver, $A_{now}(n)$ is the current AGC attenuation of the beacon receiver (value used during the interval to generate $B_{pwr}(n)$), and C is a constant to map FPGA units into dB. The interval used to generate $B_{pwr}(n)$ may be the 66.7 msec interval preceding the sample (for a 15 Hz input rate). For each sample it should be determined whether it was possible for an AGC attenuation change to take place during the interval used to generate the sample. If the answer is yes, equation (5) should be used to determine $B_{now}(n)$. This may result in one or more missed samples as a result of an AGC attenuation change. This is generally okay since AGC attenuator changes are infrequent. This process provides $B_{now}(n)$ values even when AGC attenuation values change.

(5) Observed Level of Rain Fade on Return Downlink

The observed level of rain fade on the return downlink may also be used to determine P* in accordance with an embodiment of the present invention. Since $B_{now}$ represents the current level of the satellite beacon signal power and $B_{cs}$, represents the clear sky level of the satellite beacon signal power, the quantity $B_{cs}-B_{now}$ can provide an estimate of the observed level of rain fade on the return downlink.

(6) Gateway Demodulator AGC

Gateway demodulator AGC may also be used to determine P* in accordance with an embodiment of the present invention. In some embodiments, the return link power control may be sensitive to demodulator IF gain when absolute signal power measurements are used. The gateway demodulator AGC may provide periodic adjustments to the demodulator IF gain. The two modes of operation of the demodulator AGC (initial and steady state) are described below.

Initial demodulator AGC operation is typically performed upon power up before any user traffic has been scheduled and before gateway calibration. The initial demodulator AGC operation may include a sequence of power measurements and MCD attenuation settings. The RCG channelization may have any configuration during the initial demodulator AGC operation.

During initial demodulator AGC operation, total power estimates may be provided by the channelizer at a specified rate. For example, in an embodiment the total power estimates are provided at a rate of approximately once per mSec. The total power in, for example, a 125 MHz A/D sampling bandwidth may be determined from channelizer supplied data using the following equation:

$$P_{A/D}=10 \log_{10}(P_{total})+C1 \quad (6)$$

where $P_{total}$ may be the sum of $I^2+Q^2$ over a specified interval. The constant C1 may be selected so that $P_{A/D}$ is the power at the A/D converters relative to full scale power (A/D operating backoff). Equation (6) provides total power in dB.

AGC operations for one iteration may be completed by determining a power level error signal and adjusting the demodulator IF gain using the following equations:

$$Err=(P_{A/D}+E_s/N_{o\_init})-P^*_{A/D} \quad (7)$$

$$Atten_{IF}=Atten_{IF}+Err \quad (8)$$

where $P^*_{A/D}$ is a desired signal power level at the A/D assuming carriers are present on all channels in both RCGs and $E_s/N_{o\_init}$ is a fixed value, for example, 10 dB.

The attenuation in equation (8) may be a floating point value and may be rounded to the resolution of the demodulator attenuator ($q_{AGC}$). The actual attenuation value is then determined using the following equation:

$$A_{HW} = q_{AGC} \cdot \text{round}\left(\frac{Atten_{IF}}{q_{AGC}}\right) \quad (9)$$

where $A_{HW}$ may be partitioned across several attenuators as a function of the total attenuation.

T_AGC seconds after the attenuation values are changed the measure and set process may be repeated. The iterations may be repeated, for example, until two consecutive error measurements (Equation (7)) have absolute values $<\gamma_{AGC}$. In an embodiment, $\gamma_{AGC}$ may be about 1 dB, and T_AGC may be greater than an attenuator processing delay (e.g., about 50 mSec).

The steady state demodulator AGC operation may include checking the A/D power levels once every T_check seconds and adjusting the IF gain if necessary. As an example, in an exemplary process the total possible signal power at the A/D converter is determined every T_check seconds using the following equation:

$$P_{A/D}=10 \log_{10}(P_{RCG1}+P_{rcg2})+C1 \quad (10)$$

where C1 is a constant that relates power to A/D backoff. $P_{RCG1}$ may be calculated using the following equation:

$$P_{RCG1} = \sum_{k=0}^{K-1} 10^{P^*(k)/10} + C \quad (11)$$

where $P_{RCG1}$ is over the K channels in RCG1 and P*(k) is the target signal power in channel number k of RCG1. $P_{RCG2}$ may be determined in a similar manner. Measurement of actual power at the A/D converter may not be required because:

1. Return link power control maintains the EIRP of each user terminal such that the signal power in channel k will be P*(k);
2. As gateway rain attenuation changes, received satellite beacon power changes and thus the target signal power P*(k) changes. Hence, the calculated power at the A/D converter ($P_{A/D}$) changes dB for dB with the rain attenuation such that the demodulator AGC is operating based on the satellite beacon power.
3. Periodic gateway calibration changes the calibration polynomial such that any changes in RF or IF gain will be incorporated in the calculation of P*(k).

$P_{A/D}$ may, however, be determined by direct measurement at the A/D converter. Note that direct measurements may vary with load of return channel traffic and may not provide the power under a condition of all carriers present.

The IF gain may be adjusted if $P_{A/D}$ (either calculated or measured directly) is not within a specified window. For example, in one embodiment, adjustment of the IF gain may be determined using the following equation:

$$|P_{A/D}-P^*_{A/D}|>\gamma_{adjust} \quad (12)$$

where $P^*_{A/D}$ is a target signal power (when signals are present in all channels in both RCGs) and may be the same quantity used in the initial demodulator AGC operation.

If an adjustment to the IF gain is required, an adjustment may be performed, for example, using the following procedure:
1. Freeze common mode (home channel) loops on all channels for both RCG1 and RCG2. This may be done by setting an error signal (Err(k)) equal to zero for all PMMs;
2. Increase the IF gain by $\Delta_{HW}$ dB, where a positive value results in smaller IF;
3. New values for P*(k) may be determined using Equation (1) since $A_{now}$ has changed; and
4. Unfreeze the common mode loops. This ensures that subsequent loop processing does not occur until after the IF gain changes and P*(k) updates are known to take affect.

The IF gain in step 2 may be calculated using the following equation:

$$\Delta_{HW} = q_{AGC} \cdot \text{round}\left(\frac{P_{A/D} - P^*_{A/D}}{q_{AGC}}\right) \quad (13)$$

Using this process the calculated signal power at the AGC will be approximately the same as the target signal power level.

Note that as the satellite beacon receiver AGC changes the absolute satellite beacon power changes but the normalized satellite beacon power ($B_{now}$) does not change. The satellite beacon processing described above ensures that there is no transient in $B_{now}(n)$ due to satellite beacon receiver AGC attenuation changes. As a result, there is no impact to P*(k) for any of the RCGs. For the satellite beacon receiver, changing the AGC attenuation value changes P*(k) by virtue of changing $A_{now}$ rather than through changes to $B_{now}$ (see Equation (1)).

Figure 6:
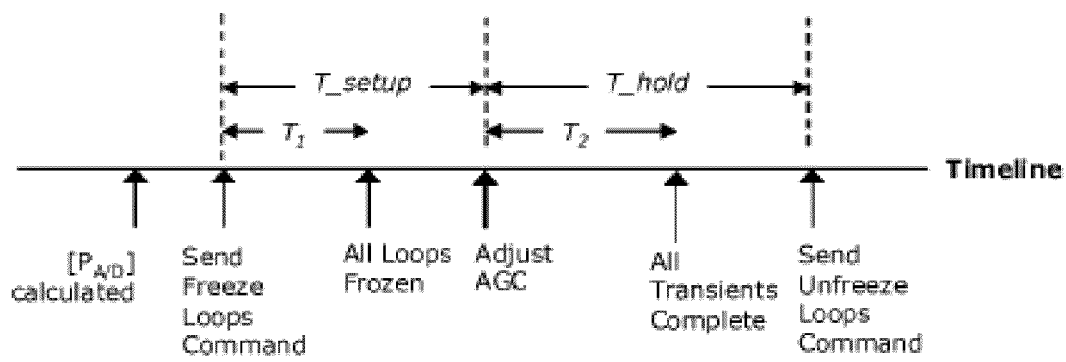
FIG. 6 is a simplified diagram showing a timeline that may be used for demodulator automatic gain control (AGC) in accordance with an embodiment of the present invention.

Due to delays in demodulator processing and queuing, there may be uncertainty as to which attenuation settings were applied for some bursts. The timeline illustrated in FIG. 6 may be used in some embodiments to make demodulator AGC changes and to reduce the uncertainty. Once it has been determined that demodulator AGC needs to be changed, a command may be sent to applicable modules to freeze the loops. $T_1$ represents the maximum time duration for the modules to freeze the loops. Demodulator AGC may be changed approximately T_setup (>$T_1$) mSec after sending the command to freeze the loops. $T_2$ represents the time duration for transients to occur in response to the AGC change. A command may be sent to unfreeze the loops T_hold (>$T_2$) mSec after the AGC change. T_setup may depend on processing speed. For example, if demodulator delay is less than 20 mSec for a 32 byte PMM, the value of T_hold may be 50 mSec.

(7) Channel Symbol Rate

Channel symbol rate may also be used to determine P* in accordance with an embodiment of the present invention.

Return Link Power Control

Figure 7:
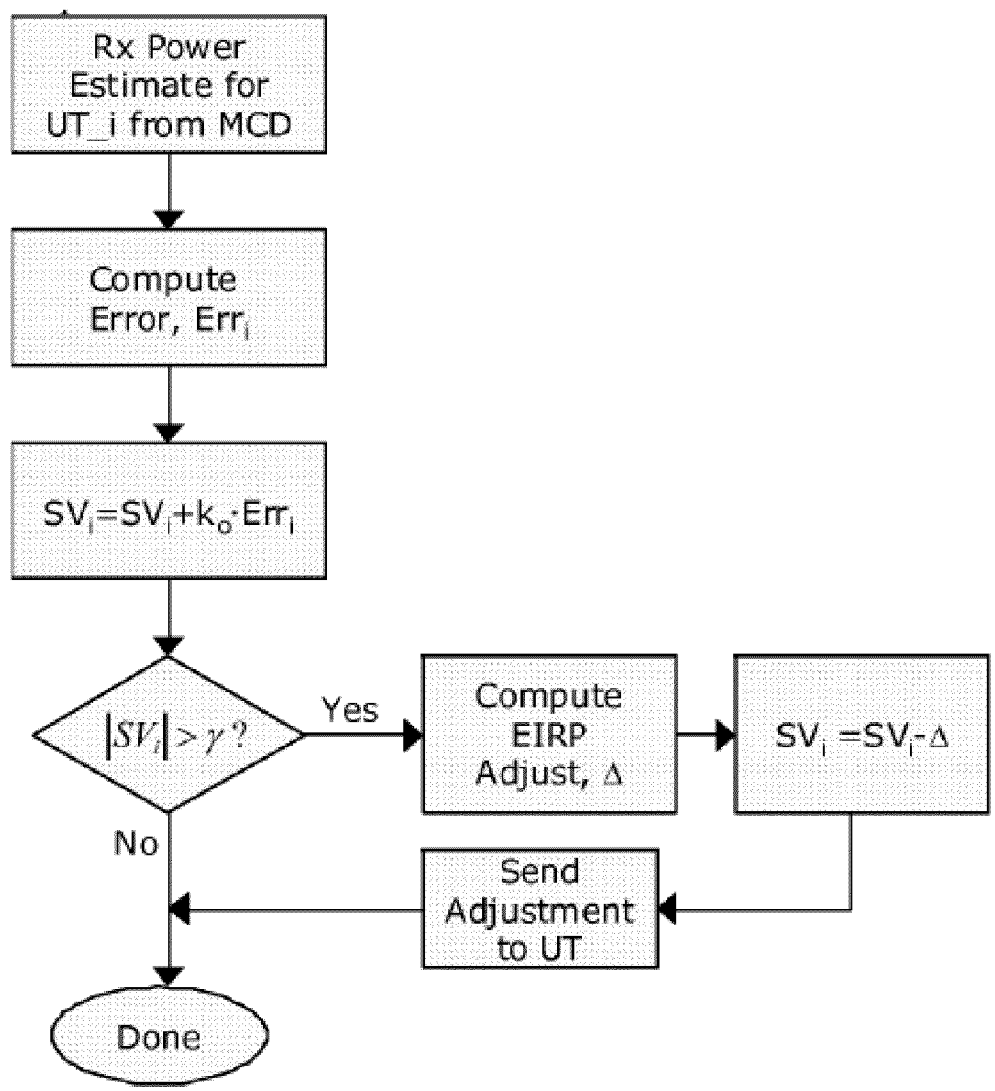
FIG. 7 is a simplified flowchart illustrating an exemplary method of return link power control in accordance with an embodiment of the present invention.

FIG. 7 is a simplified flowchart illustrating an exemplary method of return link power control in accordance with an embodiment of the present invention. The exemplary method may be performed for each estimated message signal power received (e.g., for every correctly received PMM), every X number of estimated message signal powers received, at specified intervals, or the like as would be appreciated by one of ordinary skill in the art. As illustrated in this example, an estimated message signal power is received for user terminal number i (labeled "Rx Power Estimate for UT_i from MCD" in FIG. 7). For TDMA operations, each user terminal 130 typically operates on a single carrier until its channel changes, so the dependence of P* on k is dropped in this example for brevity. An error ($Err_i$) may be computed using the following equations:

$$Err_i = P^* - C_1 \cdot P_i \text{ when SINR} \cdot C_2 < \text{SINR\_Max} \quad (14)$$

$$Err_i = \text{SINR\_Max} - \text{SINR} \cdot C_2 \text{ when SINR} \cdot C_2 \geq \text{SINR\_Max} \quad (15)$$

where $P_i$ is the estimated message signal power, and $C_1$ and $C_2$ are constants to compensate for FPGA scaling. $P_i$ and SINR may be provided by one or more demodulators at the gateway 115. The term SINR_Max may represent a clamping value that is used to keep the EIRP of each user terminal 130 from exceeding a maximum value regardless of the target signal power P*. The value for SINR_Max should typically be slightly higher than the expected end-to-end SINR under favorable interference conditions. If the burst was not received error free then $Err_i$ may be set to zero.

The filter state variable ($SV_i$) is compared against a threshold ($\gamma$) to determine if EIRP should be adjusted for the user terminal 130 sending the message. The threshold is typically an adjustable parameter and in one embodiment may be in the range of about 0.25 to about 0.5 dB. $k_o$ is a loop filtering parameter that may be a function of the PMM interval. A typical value for $k_o$ may be, for example, about 1 second. If an EIRP adjustment is necessary it may be computed as follows:

$$\Delta = q \cdot \text{round}\left(\frac{SV_i}{q}\right) \quad (16)$$

where q is a desired resolution of the EIRP adjustment, and round $$\left(\frac{SV_i}{q}\right)$$

rounds to the next integer value. The EIRP adjustment may be sent to the user terminal 130, or the adjustment may be used to determine an adjusted EIRP value or setting that may be sent to the user terminal 130.

Figure 8:
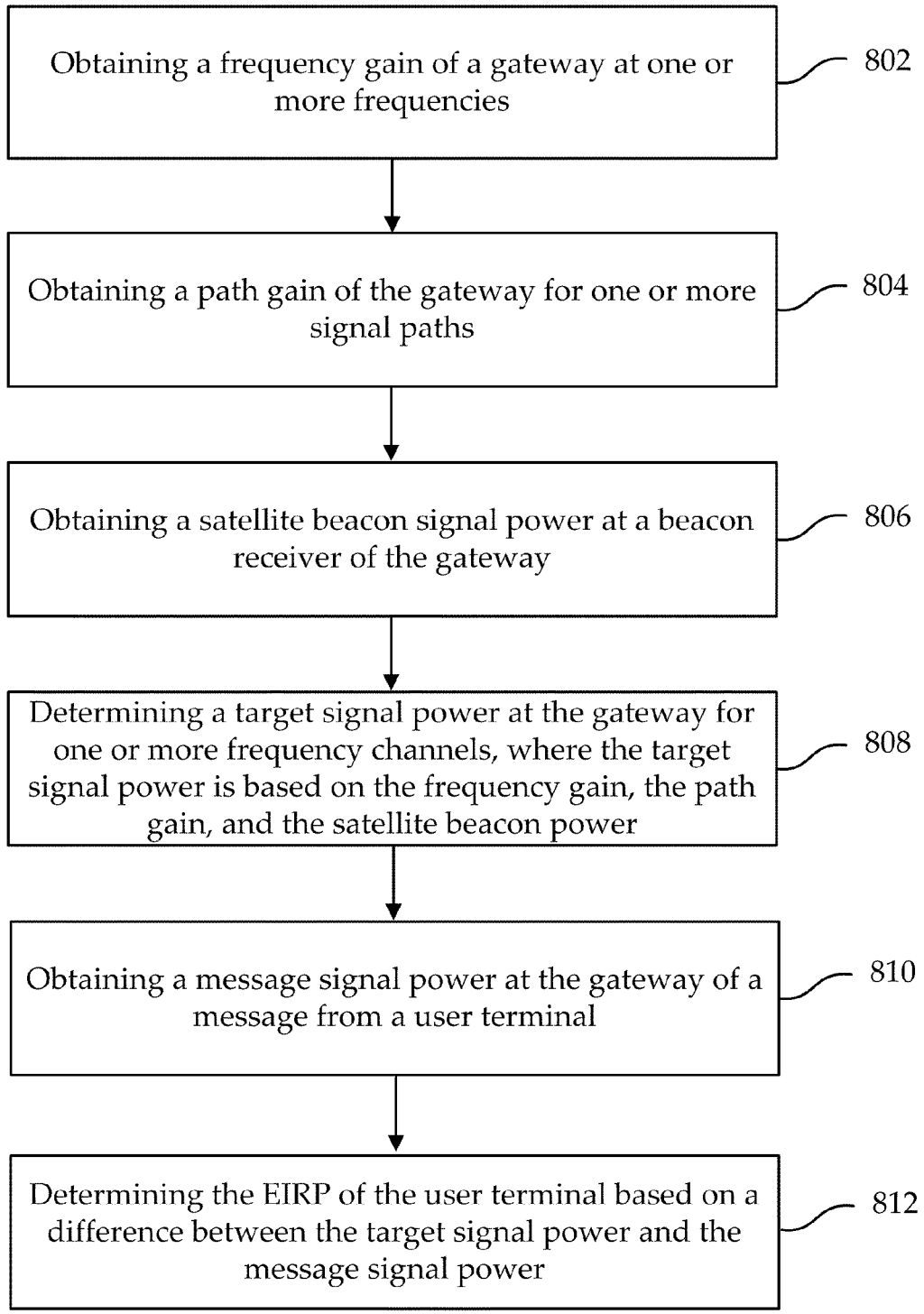
FIG. 8 is a simplified flowchart illustrating an exemplary method for determining effective isotropic radiated power (EIRP) of user terminals in a satellite communication system in accordance with an embodiment of the present invention.

FIG. 8 is a simplified flowchart illustrating an exemplary method for determining EIRP of user terminals in a satellite communication system in accordance with an embodiment of the present invention. The method includes obtaining a frequency gain of a gateway at one or more frequencies (802). In an embodiment, the frequency gain may be based on an input power of a pilot tone and a measured power of the pilot tone at a demodulator. The method also includes obtaining a path gain of the gateway for one or more signal paths (804). The path gain may be a gain of one or more signal paths at the gateway between at least a plurality of low noise amplifiers and a plurality of demodulators. The method also includes obtaining a satellite beacon signal power at a beacon receiver of the gateway (806). The beacon receiver may be a demodulator at the gateway. The method also includes determining a target signal power at the gateway for one or more frequency channels, where the target signal power is based on the frequency gain, the path gain, and the satellite beacon signal power (808). In some embodiments the target signal power may be based on one or more additional factors such as a target EIRP density of a return downlink, an EIRP of a satellite beacon, a rain fade level of the return downlink, and/or an automatic gain control of a demodulator at the gateway. The method also includes obtaining a message signal power at the gateway of a message from a user terminal (810). The message signal power may be estimated by a demodulator at the gateway. The method also includes determining the EIRP of the user terminal based on a difference between the target signal power and the message signal power (812). The EIRP may be sent to the user terminal using, for example, a forward link transmission from the gateway.

It should be appreciated that the specific steps illustrated in FIG. 8 provide a particular method for determining EIRP of user terminals in a satellite communication system. The steps outlined above may be carried out by system software and/or hardware, and in some embodiments the steps may be continuously repeated. Also, other sequences of steps may be performed according to alternative embodiments. For example, the steps outlined above may be performed in a different order. Moreover, the individual steps illustrated in FIG. 8 may include multiple sub-steps that may be performed in various sequences as appropriate to the individual step. Furthermore, additional steps may be added or removed depending on the particular application. One of ordinary skill in the art would recognize many variations, modifications, and alternatives.

Figure 9:
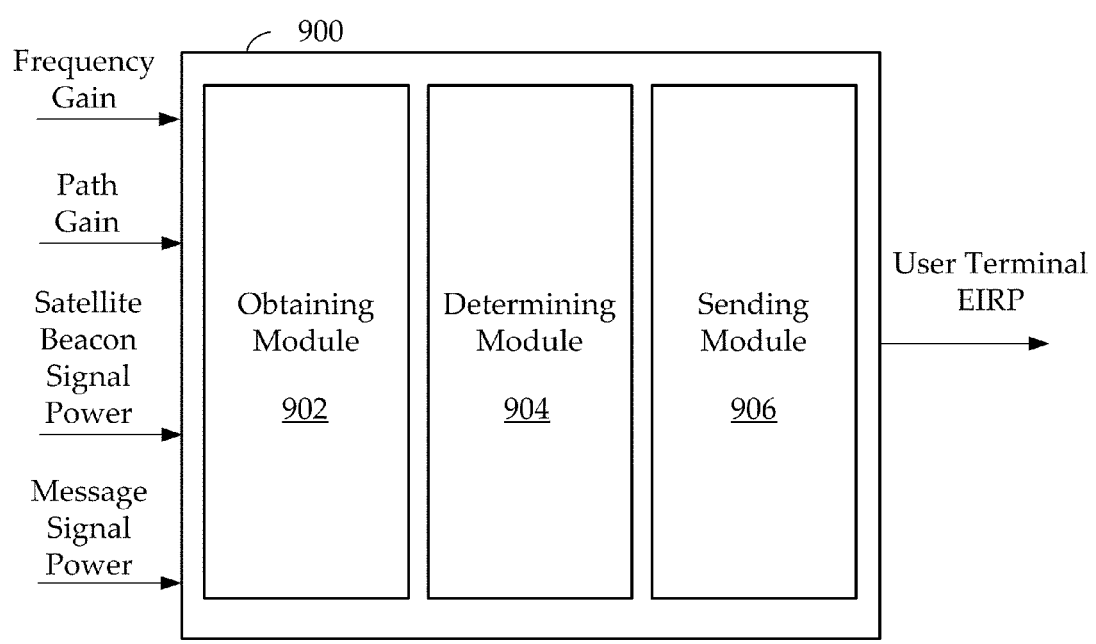
FIG. 9 is a simplified block diagram of an apparatus for determining EIRP of user terminals in a satellite communication system in accordance with an embodiment of the present invention.

FIG. 9 is a simplified block diagram of an apparatus 900 for determining EIRP of user terminals in a satellite communication system in accordance with an embodiment of the present invention. The apparatus 900 includes an obtaining module 902 configured to obtain at least one of a frequency gain or a path gain of a pilot tone in a gateway, obtain a satellite beacon signal power at a the gateway, and obtain a message signal power at the gateway of a message from a user terminal. The obtaining module 902 may also be configured to obtain a target EIRP density of a return downlink, an EIRP of satellite beacon, a rain fade level of the return downlink, and/or an automatic gain control of a demodulator at the gateway. The apparatus 900 also includes a determining module 904 configured to determine a target signal power at the gateway based at least in part on at least one of the frequency gain, the path gain, or the satellite beacon signal power, and determine the EIRP of the user terminal based at least in part on a difference between the message signal power and the target signal power. The apparatus 900 also includes a sending module 906 configured to send the EIRP to the user terminal.

The apparatus 900 is not limited to a particular device within the satellite communications system 100. The apparatus 900 may include one or a combination of two or more devices. For example, the apparatus 900 may comprise a gateway command center, one or more gateways 115, or any other device within the satellite communications system 100.

It should be noted that the methods and apparatuses discussed throughout the specification are provided merely as examples. Various embodiments may omit, substitute, or add various procedures or components as appropriate. For instance, it should be appreciated that features described with respect to certain embodiments may be combined in various other embodiments. Also, measurements can be made and the various values provided in any units. Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other mediums capable of storing, containing, or carrying instructions or data.

Having described several embodiments, it will be recognized by those of skill in the art that various modifications, alternative constructions, and equivalents may be used without departing from the spirit of the invention. For example, the above elements may be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for determining effective isotropic radiated power (EIRP) of user terminals in a satellite communication system, the method comprising:
    obtaining a frequency gain measurement at each of a plurality of different frequencies at a gateway, the frequency gain measurement determined based on a difference between an input signal power and a measured signal power at the gateway for each of the plurality of different frequencies;
    obtaining a path gain measurement for each of a plurality of different signal paths at the gateway, the path gain measurement determined based on a difference between an input signal power and a measured signal power at the gateway for each of the plurality of different signal paths;
    obtaining a satellite beacon signal power measurement at a receiver of the gateway;
    obtaining a clear sky satellite beacon signal power measurement at a receiver of the gateway;
    determining a rain fade level on a return downlink between a satellite and the gateway based on a difference between the satellite beacon signal power measurement and the clear sky satellite beacon signal power measurement;
    determining a target signal power at the gateway for one or more frequency channels, the target signal power based on the frequency gain measurement, the path gain measurement, and the rain fade level;
    obtaining a message signal power at the gateway of a message from a user terminal; and
    determining the EIRP of the user terminal based on a difference between the target signal power and the message signal power.

2. The method of claim 1 further comprising obtaining an automatic gain control of one or more demodulators at the gateway.

3. The method of claim 1 wherein the target signal power is based on the frequency gain measurement, the path gain measurement, the rain fade level, and an automatic gain control of a demodulator at the gateway.

4. The method of claim 1 further comprising:
    obtaining a target EIRP density of a return downlink;
    obtaining an EIRP of a satellite beacon; and
    obtaining an automatic gain control of a demodulator at the gateway, wherein the target signal power is based on the frequency gain measurement, the path gain measurement, the target EIRP density, the EIRP of the satellite beacon, the rain fade level, and the automatic gain control of the demodulator.

5. The method of claim 1 wherein the message signal power is provided by a demodulator at the gateway.

6. The method of claim 1 wherein the plurality of different signal paths extend between a plurality of low noise amplifiers and a plurality of demodulators at the gateway.

7. The method of claim 1 wherein the message from the user terminal is one of a plurality of messages from the user terminal sent at a specified rate.

8. The method of claim 1 wherein the frequency gain measurement is based on an input power of a pilot tone at each of the plurality of different frequencies and a corresponding measured power of the pilot tone at each of the plurality of different frequencies.

9. The method of claim 1 wherein the path gain measurement is based on an input power of a pilot tone, a measured power of the pilot tone at a demodulator, and a signal path of the pilot tone between an input of the pilot tone and the demodulator at the gateway.

10. The method of claim 1 wherein the plurality of different frequencies for obtaining the frequency gain measurement are located in frequency between adjacent frequency channels.

11. The method of claim 1 wherein obtaining the frequency gain measurement includes determining, at each of the plurality of different frequencies, a difference between a gain at a specified frequency and a gain at a frequency associated with the satellite beacon signal power measurement.

12. The method of claim 1 wherein the satellite beacon signal power measurement is normalized to account for automatic gain control attenuation of a beacon receiver at the gateway.

13. A process for controlling power of return link transmissions in a satellite communications system, the process comprising:
  determining a first signal power of a first message from a user terminal;
  determining a first target signal power for one or more frequency channels, the first target signal power determined based on:
    a frequency gain measurement at each of a plurality of different frequencies at a gateway, the frequency gain measurement determined based on a difference between an input signal power and a measured signal power at the gateway for each of the plurality of different frequencies,
    a path gain measurement for each of a plurality of different signal paths at the gateway, the path gain measurement determined based on a difference between an input signal power and a measured signal power at the gateway for each of the plurality of different signal paths, and
    a rain fade level on a return downlink between a satellite and the gateway, the rain fade level determined based on a difference between a satellite beacon signal power measurement at a receiver of the gateway and a clear sky satellite beacon signal power measurement at a receiver of the gateway,
  determining a first EIRP of the user terminal based on a difference between the first signal power of the first message and the first target signal power;
  waiting a period of time; and
  repeating the process by determining a second signal power of a second message from the user terminal, determining a second target signal power, and determining a second EIRP of the user terminal based on a difference between the second signal power of the second message and the second target signal power.

14. The process of claim 13 wherein the first target signal power is based on the frequency gain measurement the path gain measurement a target EIRP density of a return downlink from a satellite to the gateway, an EIRP of the satellite beacon, the rain fade level of the return downlink, and an automatic gain control of a demodulator at the gateway.

15. The process of claim 13 wherein the satellite beacon signal power measurement is normalized to account for automatic gain control attenuation of a beacon receiver at the gateway.

16. An apparatus for determining effective isotropic radiated power (EIRP) of user terminals in a satellite communications system, comprising:
  an obtaining module configured to:
    obtain a frequency gain measurement at each of a plurality of different frequencies at a gateway, the frequency gain measurement determined based on a difference between an input signal power and a measured signal power at the gateway for each of the plurality of different frequencies;
    obtain a path gain measurement for each of a plurality of different signal paths at the gateway, the path gain measurement determined based on a difference between an input signal power and a measured signal power at the gateway for each of the plurality of different signal paths;
    obtain a satellite beacon signal power measurement at the gateway;
    obtain a clear sky satellite beacon signal power measurement at the gateway; and
    obtain a message signal power at the gateway of a message from a user terminal;
  a determining module configured to:
    determining a rain fade level on a return downlink between a satellite and the gateway based on a difference between the satellite beacon signal power measurement and the clear sky satellite beacon signal power measurement;
    determine a target signal power at the gateway based on the frequency gain measurement, the path gain measurement, and the rain fade level; and
    determine the EIRP of the user terminal based on a difference between the message signal power and the target signal power.

17. The apparatus of claim 16 further comprising a sending module configured to send the EIRP to the user terminal.

18. The apparatus of claim 16 wherein the satellite beacon signal power measurement is normalized to account for automatic gain control attenuation of a beacon receiver at the gateway.

19. The apparatus of claim 16 wherein the obtaining module is further configured to:
  obtain a target EIRP density of a return downlink;
  obtain an EIRP of satellite beacon; and
  obtain an automatic gain control of a demodulator at the gateway.

20. The apparatus of claim 19 wherein the target signal power is based on the frequency gain measurement, the path gain measurement, the target EIRP density, the EIRP of the satellite beacon, the rain fade level, and the automatic gain control of the demodulator.

* * * * *